United States Patent [19]

Oh

[11] Patent Number: 5,231,310

[45] Date of Patent: Jul. 27, 1993

[54] ELECTRICAL AND ELECTRONIC APPLIANCE LOCK

[76] Inventor: Soo-Young Oh, 43553 Euclid Dr., Fremont, Calif. 94539

[21] Appl. No.: 577,971

[22] Filed: Sep. 5, 1990

[51] Int. Cl.[5] .............................................. H04N 5/44
[52] U.S. Cl. ................................... 307/142; 358/349; 358/188
[58] Field of Search .................. 307/141, 142, 72, 75, 307/112, 140; 358/349, 188; 70/14, 15, 58; 439/133, 373, 846, 848, 299, 328, 346

[56] References Cited

U.S. PATENT DOCUMENTS

| | | | |
|---|---|---|---|
| 3,879,332 | 4/1975 | Leone | 200/33 R |
| 4,015,139 | 3/1977 | Cleary et al. | 307/141 |
| 4,167,658 | 9/1979 | Sherman | 200/44 |
| 4,246,495 | 1/1981 | Pressman | 307/141 |
| 4,482,789 | 11/1984 | McVey | 200/44 |
| 4,484,220 | 11/1984 | Beetner | 358/190 |
| 4,488,764 | 12/1984 | Pfenning et al. | 339/37 |
| 4,510,623 | 4/1986 | Bonneau et al. | 455/181 |
| 4,566,033 | 1/1986 | Reidenouer | 358/115 |
| 4,588,901 | 5/1986 | Maclay et al. | 307/141 |
| 4,636,595 | 1/1987 | Smock et al. | 200/38 |
| 5,051,837 | 9/1991 | McJunkin | 358/349 |

OTHER PUBLICATIONS

Rzeszewski et al., *IEEE Trans. Consum. Electron.*, vol. CE-24, pp. 145-153, May 1978.

*Primary Examiner*—A. D. Pellinen
*Assistant Examiner*—Aditya Kirshnan
*Attorney, Agent, or Firm*—Townsend and Townsend Khourie and Crew

[57] ABSTRACT

An electronic appliance lock can be used on televisions and other appliances for which use control is sought. In one embodiment, the lock sits atop a television set or is manufactured integrally with the television. In another embodiment the lock is made to plug directly into an electrical socket. Input and output are done by either keys and a display on the lock itself, or by using a remote control device and using the television screen as a display. The lock is capable of limiting use of the controlled appliance to either a fixed number of hours per preset allotment period, as well as blocking use during specified periods of time. In some embodiments access to one or more channels is regulated.

19 Claims, 6 Drawing Sheets

ELECTRICAL AND ELECTRONIC APPLIANCE LOCK

BACKGROUND OF THE INVENTION

This invention relates to improved appliance locks, which control the use of an appliance through the control of the power supplied to the appliance. Appliance locks are very useful on televisions in homes of families having children, since parents can control their children's viewing habits automatically.

While meeting with substantial success, prior locks have also met with certain limitations. For example, some locks require parents to keep track of keys, some locks have mechanical components that are prone to failure. Other locks have limited functionality; for example, some locks do not allow for control of both total time and time blocks for viewing. Other locks are excessively complex, unreliable, or expensive to fabricate. Further, such systems do not block access of children to undesirable television stations during selected times.

From the above, it is seen that an improved appliance lock system is desired.

SUMMARY OF THE INVENTION

The present invention captures an appliance plug, and using electronic circuitry, controls the supply of power to the appliance. The control of the lock is available to anyone having access to a password which is used to unlock the programmability of the device. Typically, a parent would have the password and the children would not. A parent enters the password and set limits as to ranges of time during the day when the appliance, typically a television, could not be used. A parent also, after entering the password, sets a limit on the total viewing time allowed in a day. As a further feature, the parent, again using the password, could set the lock into an unlimited viewing mode, such that the amount of limited viewing time is not reduced even when the television is in use. This mode is useful to permit unimpeded viewing. In one preferred embodiment, access to preselected channels is limited.

The invention also contains a plug capture device which permanently captures the plug of the television. This allows for very inexpensive manufacture, and also prevents resourceful children from bypassing the control mechanism.

Further advantages and features of the invention may be recognized with reference to the appended description and drawings.

DESCRIPTION OF THE PREFERRED EMBODIMENT

Although the description below, for clarity, refers to a parent's control of a television, the disclosed invention is equally usable by any set of persons where some persons have authority to control the appliances and other persons are subject to that control.

Figure 1:
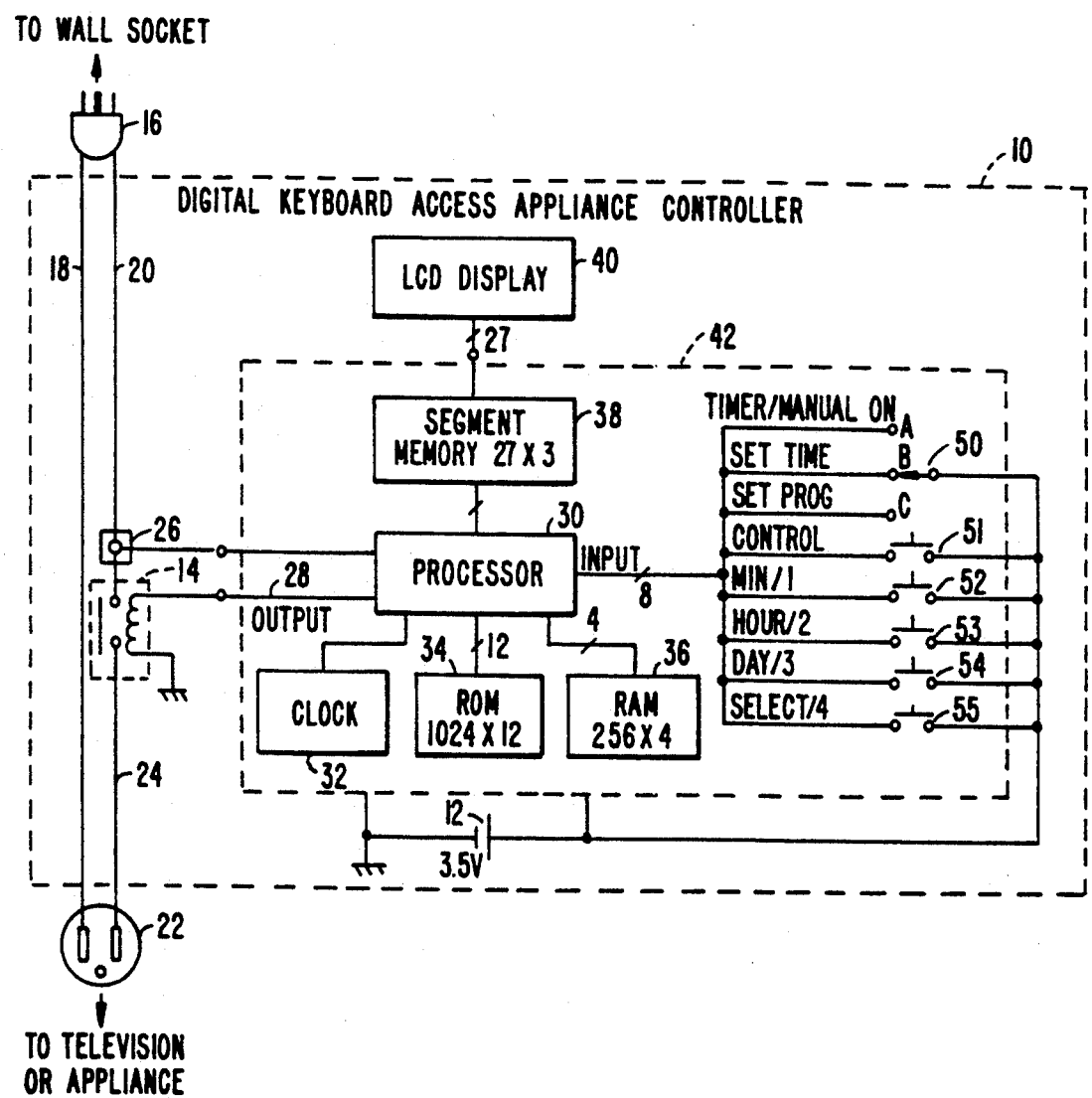
FIG. 1 is an electrical block diagram of one embodiment of the lock.

FIG. 1 shows the basic elements of the invention in a block diagram form. The power for lock 10 is supplied by an internal battery 12. A relay 14, which can be either on or off, determines whether the attached appliance will receive power. During normal operation, a power plug 16 is plugged into a conventional wall socket. To keep the costs of production low, and to prevent a child from removing the power source and disrupting the operation of the lock, the power for the lock is not supplied by the wall socket.

The power plug 16 has a neutral wire 18 and a power side hot wire 20. The neutral wire 18 is connected directly between the power plug 16 and a socket 22; the power side hot wire 20 is connected indirectly to the socket side hot wire 24 via a current sensor 26 and the relay 14. When the relay 14 is on, the two hot wires 20, 24 are connected, allowing power to flow from the wall socket to the appliance. When the relay 14 is off, the two hot wires 20, 24 are not connected, and no power is supplied to the socket 22. The current sensor 26 indicates whether the attached appliance is on or off. If the appliance is off, the lock does not reduce the total remaining time for use of the appliance.

The relay 14 is turned on and off, via output 28, at the direction of the electronic circuitry 42, which is comprised of a processor 30, a clock 32, which supplies timing pulses to the processor 30, a read only memory (ROM) 34, which stores programs and constants used by the processor 30, a random access memory (RAM) 36, which stores data and variables used by the processor while running programs, and switches 50 through 55, which supply input to the processor 30. Input is supplied by the user by setting the position of toggle switch 50 and by pressing and releasing switches 51-54. The electronic circuitry is configured as a standard microprocessor circuit. Such microprocessor circuits include, for example, those made by SMOS and described in the SMOS "4 bit Single Chip Microcomputer SMC 6200 Series Guide", which is incorporated herein by reference for all purposes. The details of the program stored in ROM 34 and the interaction between the processor 30, the switches 50-55, the display 40, and the relay 14, are discussed below in greater detail.

Toggle switch 50 can be set to any one of three positions, arbitrarily labelled in FIG. 1 as A, B, and C. The processor 30 detects the position of the toggle switch 50 and detects when any momentary switches 51-54 are pressed. The effect of the settings of the toggle switch 50 and the effect of a press of each momentary switch is described below along with the detailed discussion of FIGS. 4a, 4b, and 4c.

The display 40 is capable of showing, for example, six characters, the particular characters depending on the commands sent by the processor 30. Typically, the display shows the time of day or the value of one of the variables used by the microprocessor, when the variable is being modified.

Figure 2A:
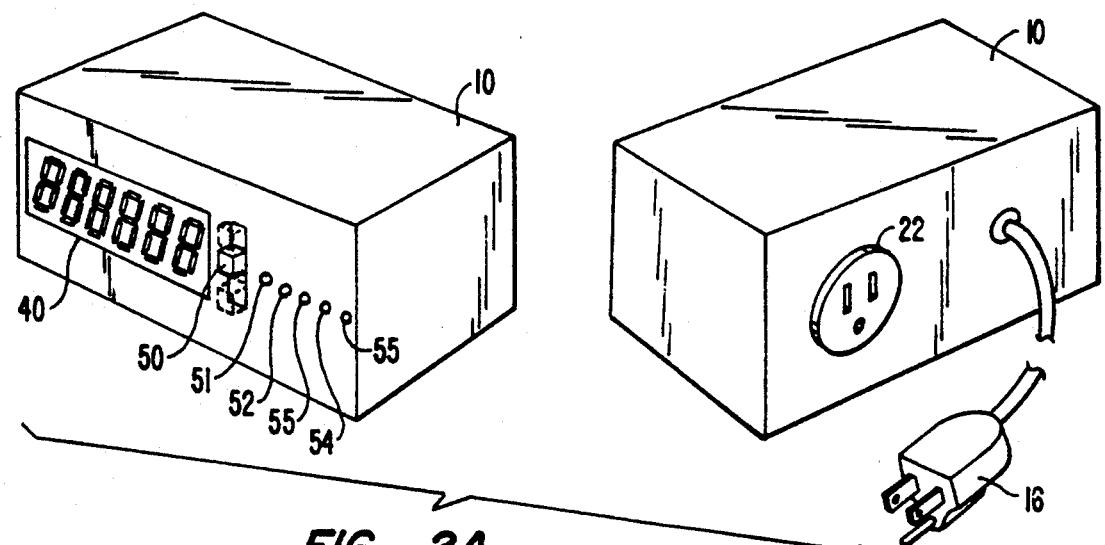
FIGS. 2a and 2b show perspective views of a table top embodiment and a plug attachable embodiment respectively.

FIG. 2a shows the mechanical features of one embodiment of the lock 10. This embodiment is designed to sit on top of the television, with the switches 50-55 and display 40 easily reachable. During normal operation, the television power plug is inserted into socket 22 in the rear of the lock 10, and the power cord 16 is inserted into a wall socket.

Figure 2B:
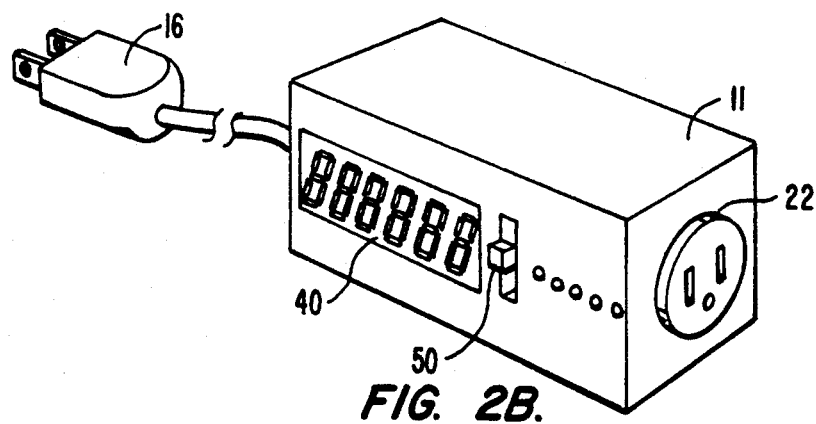

FIG. 2b shows another embodiment 11 of the lock. This embodiment is designed to be plug-attachable. One advantage of this embodiment over the table top embodiment is that this lock can be manufactured without a cord. During normal operation, the television power plug is inserted into the socket 22 on one side of the lock 11, and the lock itself is inserted into a wall socket.

Figure 3:
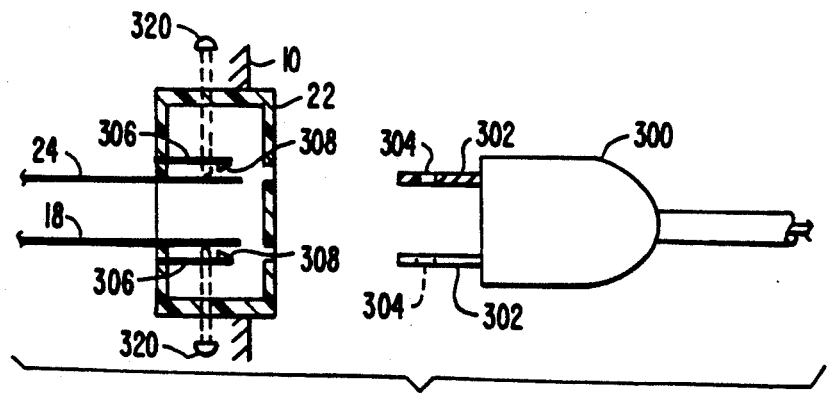
FIG. 3 is a detailed view of a plug capture mechanism.

FIG. 3 shows the optional plug capture feature of the lock. Once inserted, an appliance power plug 300 cannot be removed from the socket 22. This prevents the child from bypassing the protection of the lock by removing the appliance power plug 300 from the lock 10. Prongs 306 are mounted in socket 22 in such a manner that the prongs 302 of the appliance power plug 300 are forced against the power wires 18, 24. When the appliance power plug 300 is fully inserted into the socket 22, the teeth 308 on the prongs 306 grip the prongs 302 of the appliance power plug 300, preventing its removal. If the prongs 302 of the appliance power plug 300 have holes 304, the teeth 308 would rest in the holes 304, tightening the socket's grip on the plug.

Some appliance power plugs are made without holes 304, having only indentations or a smooth surface in place of holes 304. In another embodiment of the lock, the teeth 308 are constructed so as to grip a plug having holes, indentations, or a smooth surface. This can be done, among other methods, by having teeth 308 with sharpened points and prongs 306 held under tension sufficient that teeth 308 imbed into the appliance power plug prongs 302, or with tension sufficient to hold the prongs by friction.

After insertion of appliance power plug 300 into socket 22, appliance power plug 300 is permanently attached to socket 22 in the sense that removal of the plug requires destruction of the socket, the plug, or both. In alternate embodiments, the prongs are replaced with unidirectional screws, i.e. screws which contain ridges which enable tightening of the screws, but which do not enable removal of the screws. Unidirectional screws 320 are shown in FIG. 3. Of course, if unidirectional screws 320 are used, prongs 306 are not necessary.

Table 1 shows several variables used by processor 30 whose values are stored in memory locations located within random access memory (RAM) 36. Not all the memory locations are shown in Table 1, nor are the exact addresses and size of each variable shown. It is sufficient, for the purposes of this invention, to note that the size of the memory location used for each variable comprises memory sufficient to store any needed value for a variable to a sufficient precision. For example, the variable representing the allocated viewing time per week ranges from 0 to 168 hours, and can have a resolution of 10 minutes, so its value could be stored in less than two bytes of memory.

TABLE 1

| Memory Locations in RAM (36) |
| --- |
| Countdown Timer ($T_c$) |

TABLE 1-continued

| Memory Locations in RAM (36) |
| --- |
| Current Time/Day (T) |
| Time Allotted ($T_a$) |
| Timer Flag (F) |
| Selected Variable (S) |
| Password (P) |
| Time Range A - Start Time/Day ($S_a$) |
| End Time/Day ($E_a$) |
| Time Range B - Start Time/Day ($S_b$) |
| End Time/Day ($E_b$) |
| Time Range C - Start Time/Day ($S_c$) |
| End Time/Day ($E_c$) |

The memory locations T, $S_a$, $E_a$, $S_b$, $E_b$, $S_c$, and $E_c$ are large enough to store the time of day and the day of the week. Although these times, as all other variables, are physically stored as a series of zeroes and ones, for clarity they will be described by such terms as 11:15 Sunday, 2:30 Thursday, etc. Each pair of start and end times, such as $S_a$ and $E_a$, comprise a time range. The day for each time range (A, B, C, etc.) can be one of 10 values: Sunday, Monday, Tuesday, Wednesday, Thursday, Friday, Saturday, Every Day, Weekend, or Week Day. If a start time, say $S_a$, is set with one of the last three day designations, the corresponding end time, say $E_a$, will have the same value for the day. The last three day designations make it more convenient for a parent to block use of a television during portions of every weekday or every day, without having to enter a time range for every day of the week. The conversion from times and days to a series of zeroes and ones can be done in any number of ways commonly used by those skilled in the art of microprocessor programming.

The variable $T_c$ (countdown timer) represents the limited amount of time, which a child is allotted for television viewing. $T_c$ is reduced when a child is watching television, and is increased at the start of a new allotment period, typically the beginning of a week.

The variable T (current time) represents the current time of day and day of week. T is continually updated by the processor 30 based on timing pulses received from the clock 32. T ranges from 0:00 Sunday to 23:59 Saturday.

The variable $T_a$ (allocated time) represents the total viewing time allotted per allotment period. This number is in even hours, half hours, minutes or other resolutions. The value of $T_a$ is set and changed by the parent.

The variable F (timer flag) is either set or reset. When F=set, i.e. the timer flag is set, $T_c$ is decreased whenever the current sensor indicates that the television is on. When F=reset, $T_c$ is not decreased. F would be set normally, but reset by a parent for unlimited television use.

The variable S (variable selector) is a pointer to a selected time. If there are three time ranges as shown in Table 1, S can have a value from 0 to 5, since S can point to any one of the start or end times. S is used to keep track of which time variable is being modified.

The variable P (password) represents the password which allows access to the lock's control functions. When first accessing the lock's control functions, such as those shown in FIG. 4b, the parent enters a password by pressing a series of the keys 52-55. Access is granted if the entered password matches the password variable P. The value of P can be changed by the use of a fixed master password as described below. In the embodiment shown in FIG. 2a, which has only four keys used for the entry of passwords, a password is a string of digits from the set of 1, 2, 3, and 4.

The other variables $S_a$, $E_a$, $S_b$, $E_b$, $S_c$, and $E_c$ are times and days, and represent either the start or end time of a blocked time range. It is possible to have more than three ranges, however for simplicity only three are shown in the figure. Each pair of times, for example, $S_a$ and $E_a$, define a blocked time range. During a blocked time range, the lock will not allow the television to be operated unless the timer flag is reset, indicating that the parent wishes to bypass the protection of the lock.

By way of example, $S_a$ could be set to 7:00 a.m. Monday and $E_a$ could be set to 9:00 a.m. Monday. A program, stored in ROM 34 and described below, would prevent the relay 14 from being turned on whenever T (current time) indicates that the current time and date is between 7:00 a.m. and 9:00 a.m. Monday.

Figure 4A:
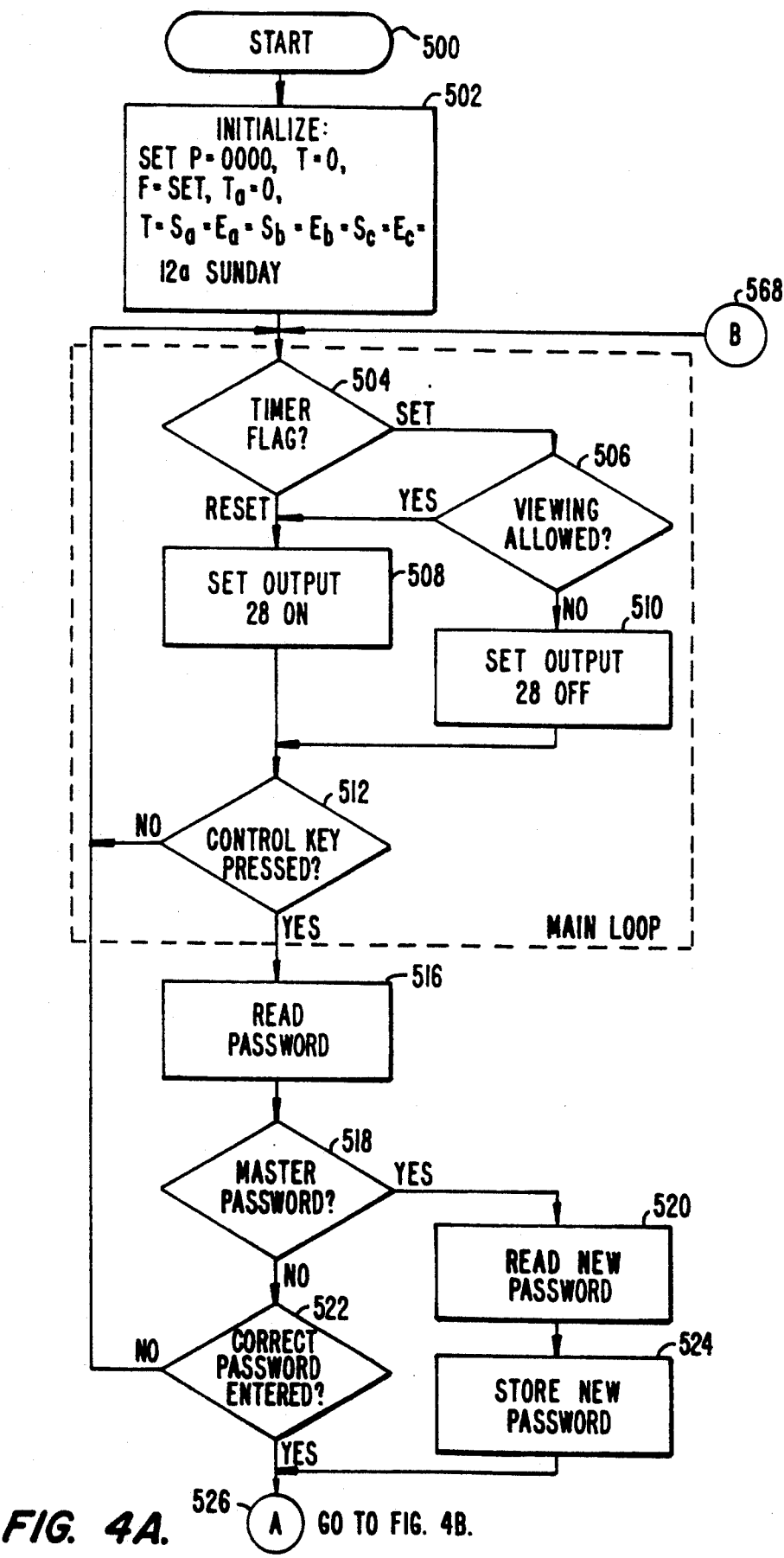
FIGS. 4a, 4b, 4c, 4d are logic flow charts showing the logic of a typical program used to control the processor.

FIG. 4a, the first of four parts of FIG. 4, is a logic diagram showing the logic and flow of the program which is stored in ROM 34 and controls the operations of processor 30. The program starts at block 500 and continues to pass control from block to block as shown in FIGS. 4a, 4b, 4c, and 4d by the lines connecting the blocks.

At block 502, several variables used by the program are set to known values as shown in FIG. 4a. The program then proceeds to block 504 and checks the timer flag F. If F is set, the program proceeds to block 506, otherwise it proceeds to block 508. At block 506, the program checks to see if viewing is allowed. The result of this query is either "yes" or "no" as shown in FIG. 4a. The logic of determining the answer to this query is described below in conjunction with FIG. 5. Generally, the program checks to ensure that $T_c$ (countdown timer) is non-zero and that T (current time) does not fall in any blocked time range.

If viewing is not allowed, the program proceeds to block 510, where the processor 30, via output 28, turns off relay 14, thereby disabling the television. If viewing is allowed, the program proceeds to block 508, where the processor 30 turns on relay 14, thereby allowing the use of the television. In either case, the program proceeds to block 512. At block 512, the processor 30 determines if the Control key 51 is being pressed by the user. As the processor is very fast in comparison to a user pressing a key, the program passes block 512 many times while a user is pressing a key. Using means known in the art, switches 51-55 are suitably debounced such that the processor 30 only receives a single pulse from any key when the key is pressed once. The processor only reads a key once each time is it pressed regardless of the length of time the key is held down.

If the Control key 51 is not been pressed, the program loops back to block 504. It is significant that, unless Control key 51 is pressed, the program is continually looping and checking whether viewing is allowed, and turning relay 14 on or off as required. This loop in the logic is referred to herein as the main loop.

If the Control key 51 is pressed when the program reaches block 512, the program proceeds to block 516. At block 516, the program waits for the user to enter a password via the keys 52-55. The keys pressed are displayed on display 40 as they are being pressed in some embodiments. A password is a string of the numbers 1, 2, 3, or 4. If, for example, a user wants to enter the password "14242", the user presses, in order, the keys 1, 4, 2, 4, and 2. As well as having a word designation for a key, such as the "Hour" key (key 53), each key has a number designation, such as the "2" key (again, key 53).

Once a password is entered, the program proceeds to block 518, where the entered password is compared to a master password permanently stored in ROM 34. If the entered password matches the stored master password, the program proceeds to block 520, otherwise to block 522.

At block 520, the processor 30 reads a second entered password from the keys and at block 524, stores it as the new password, in the variable P. The program then proceeds to point A 526, which continues the logic of the program in FIG. 4b. If the program proceeds to block 522, the entered password is compared with the variable P. If the entered password does not match P, i.e. the wrong password was entered, the program loops back to block 504, but if the correct password was entered, the program proceeds to block 526.

The use of two passwords, a regular password and a master password is significant. The regular password is often used and is generally shorter than the seldom used master password. The master password is only used to alter the regular password, as would be necessary if a child discovers the password, or the parent forgets the regular password. The master password is also necessary when the batteries are changed or removed. This is because on startup, in block 502 (FIG. 4a), P (password) is set to "0000", an invalid password, i.e. one that cannot be entered via the keys 52-55. If the password on startup were set to an valid initial password, the protection of the lock could be bypassed by anyone knowing the initial password, by merely removing and replacing the batteries.

The master password can either be provided to the parent, the purchaser of the lock, on a printed piece of paper, or, since the master password is infrequently used, the purchaser could be provided with a telephone number to call to receive the master password.

Figure 4B:
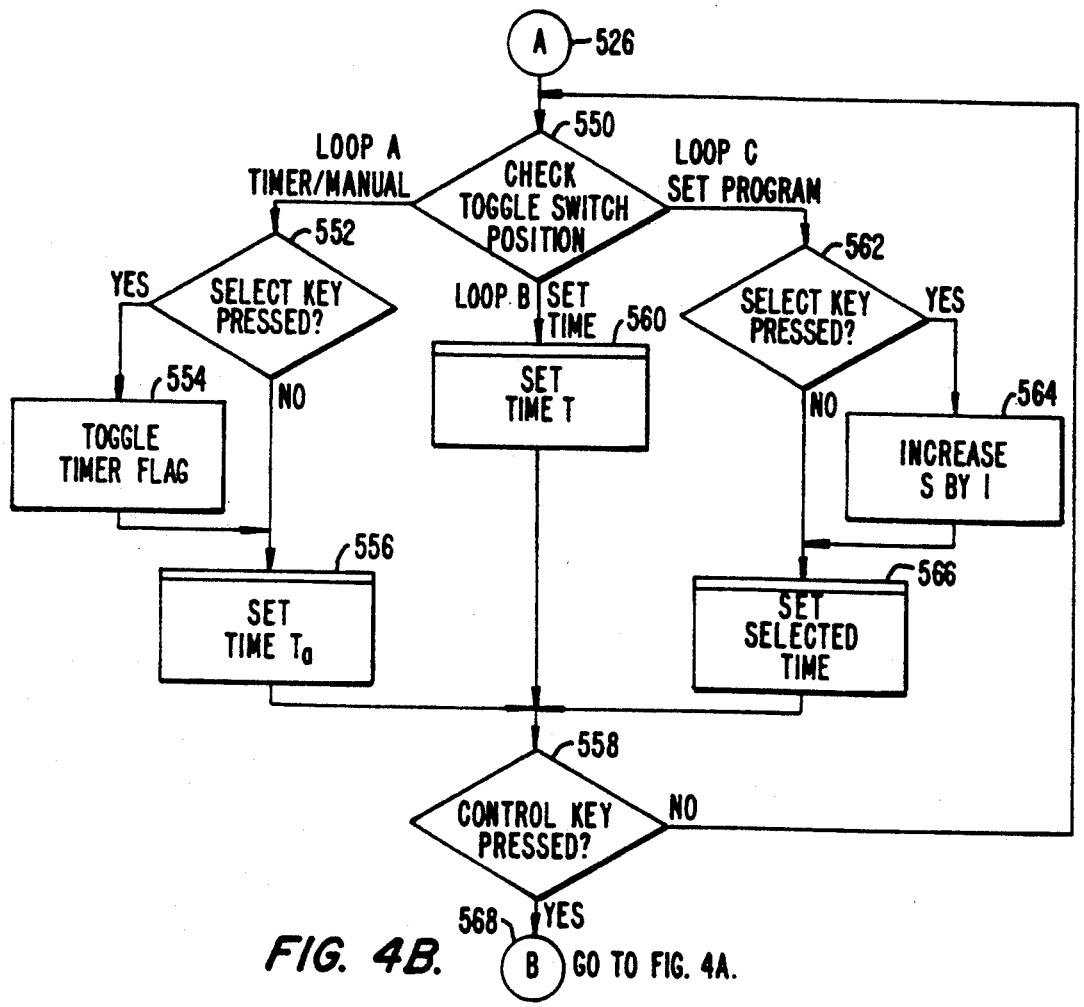

FIG. 4b shows a continuation of the logic of FIG. 4a. At point A 526, a correct password has been entered (or a correct master password and a new password have been entered). At this point, the user, presumably a parent, can reset the timer flag F to allow unlimited use of the television, or can alter the variables stored in RAM 36.

At block 550, if the toggle switch 50 is set in position A, the program will proceed to block 552. The general function of position A is to allow the parent to set and reset flag F, and to set the value of $T_a$ (time allotted). At block 552, the processor checks to see if the Select Key 51 has been pressed. If it has, the program proceeds to block 554 and toggles flag F, and then proceeds to block 556. Otherwise, the program proceeds directly to block 556.

Figure 4C:
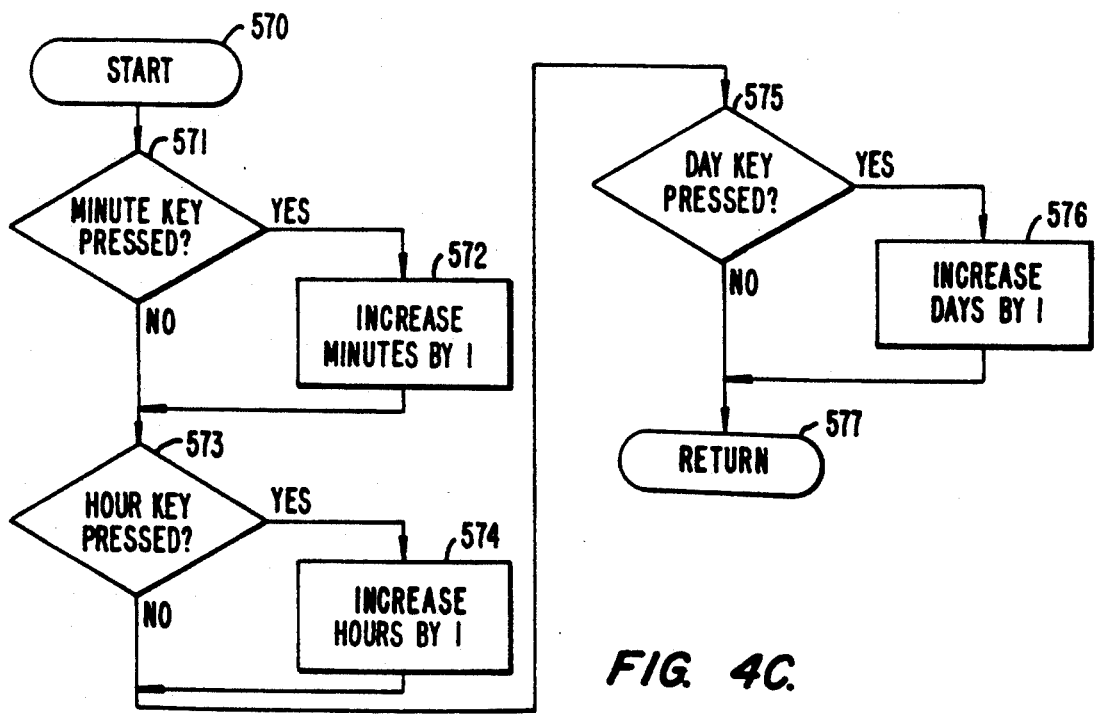

At block 556, the program reads keys 52-54 (Days, Hours, Minutes) as shown in FIG. 4c and changes the value of $T_a$ accordingly.

The program then proceeds to block 558. At this point, it should be noted that the flow of the program will continue in a loop from block 558 to block 550 along one of three paths (loop A, B, or C) until the Control Key 51 is pressed. In passing through a loop, the processor checks the toggle switch 50 and switches 51-55 and adjusts the variables in RAM 36 in response to the keys pressed.

To illustrate the operation of the program, consider the following example. The toggle switch 50 is set to position A. The user presses the Control Key 51 and the program discontinues looping in the main loop, and proceeds to block 516. The user then enters a password which is the regular password, P. Now the program is looping between blocks 550, 552, 556 and 558, i.e. loop A. This looping continues until the Control key 51 is pressed, at which time the program will return, at block 558, to point B and resume looping in the main loop.

While the program is looping in loop A, the user can push the Select key 54 to toggle F at block 554 or push the Day key 54, Hour key 53, or Minute key 52 to adjust $T_a$ (time allotted), at block 556. To return to normal, protected operation the user will push the Control Key 51, at which point the program, when it reaches block 558, will proceed to point B.

At block 550, if the toggle switch 50 is in position B, the program proceeds to block 560, where the Set Time Routine (illustrated in FIG. 4c) is used to adjust T (current time). Pressing the Control Key 51 returns the program, via block 558, to point B. This is shown as loop B.

At block 550, if the toggle switch 50 is in position C, the program proceeds to block 562, where, if the Select key 55 is pressed, the program proceeds to block 564 and points pointer S to the next time. The effect of the value of S is such that whenever the Day, Hour, or Minute keys are pressed in loop C, one of the start or end times is changed; the value of S determines which time is changed. For example, if S points to $S_4$, and the Select key 55 is pressed twice while the program is in loop C, S would then point to $S_b$. If the Select key is pressed again, S would point to $E_b$ is selected. If S points to the last end time, shown in Table 1 as $E_c$, S will point to $S_a$ after the next pressing of the Select key.

Once a start or end time is selected, the other keys will change the value of the selected time variable. For example, if S is pointing to $S_b$, and the Hour key 53 is pressed, then $S_b$ is increased by one hour. If $S_b$ was 23:00 (11:00 pm), then an increase of one hour translates to 00:00 (12:00 am). Similarly, when a time variable has a minutes component of 59 minutes and the Minute key 52 is pressed, the number of minutes changes to 0, and the number of hours do not change. Similar effects occur with the Hour and Day keys. The Day key causes the day portion of the time variable to increment through the seven days of the week and then through the special day designations of "every day", "weekdays" and "weekends".

Those skilled in the art will see that it is not necessary to limit the allotment of time periods to one week, the interval used here to describe one embodiment of an electronic appliance lock.

Figure 4D:
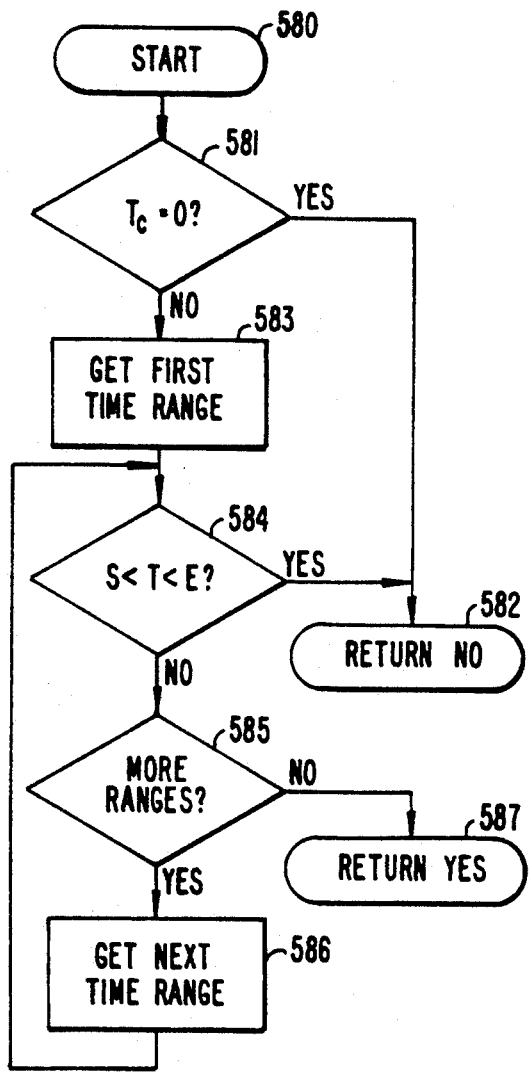

FIG. 4d illustrates the routine that preforms the process of checking whether viewing is allowed. This routine returns with a yes or no answer. This result determines the path of the program upon reaching block 506 (FIG. 4a).

The routine starts at block 580, and proceeds to block 581, where $T_c$ (countdown timer) is checked. If $T_c=0$, then all of the allotted time has been used, so viewing is not allowed. It is significant that this routine is not called if a parent has reset F, the timer flag, since the lock must allow a parent to use the television even when $T_c=0$.

If $T_c=0$, the routine returns with a result of "NO", at block 582. Otherwise, at block 583, the routine proceeds to check if the T (current time) falls into any one of the blocked time ranges. Each range is checked in turn at block 584. If T (current time) is in a blocked time range, the routine returns, at block 582, with a result of "NO". Otherwise, the routine proceeds to block 585. If all the blocked time ranges have been checked and none of the ranges include the current time, then viewing is allowed, and the routine returns with a result of "YES" at block 587. Otherwise, the routine proceeds to block 586, and the next range is checked at block 584.

In order for the user to be able to know the value of the variables stored in RAM 36, they are displayed on display 40. At different points in the program, processor 30 will send commands to display driver 38 to display the numbers on display 40 in a human-readable format. The variable chosen for display is determined by context. For example, in the main loop T (current time) is displayed. In loop C (set program) the time variable pointed to by S is displayed. The other variables stored in RAM 36 are displayed similarly. Since the variable displayed is generally being altered by the press of the keys, the user is given feedback as to the values stored in RAM.

The display 40, $T_c$ (countdown timer), and T (current time) are regularly updated by an interrupt routine, which runs at regular intervals of time, such intervals determined by the clock 32.

Figure 5:
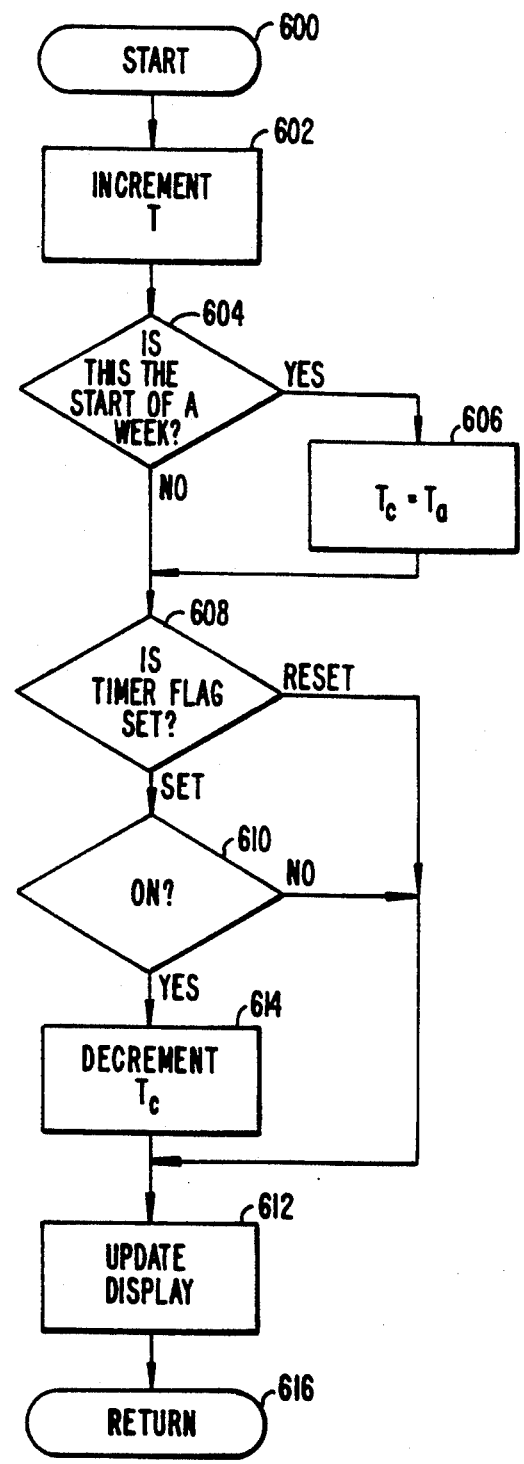
FIG. 5 is a logic flow diagram illustrating the timer interrupt routine which controls timing within a program running on the processor.

FIG. 5 illustrates the logical flow of the interrupt routine. When the clock 32 interrupts the processor 30, execution of the interrupt routine begins at block 600. The routine then proceeds to block 602, where T (current time) is incremented by an amount of time equal to the interrupt interval. For example, if the interrupts occurred at a 100 Hertz rate, 10 milliseconds (1/100 second) would be added to T at block 602.

At block 604, T is checked to see if it has just been incremented to the beginning of a week. If so, the routine proceeds to block 606, and $T_c$ (countdown timer) is set equal to $T_a$ (allotted time). At times other than the start of a week, the routine proceeds to block 608 without changing $T_c$. In an alternate embodiment, the condition in block 604 is controlled by an external hardware device which measures quantities other than elapsed time. For example, a coin box could be employed such that when a coin is put into the box, the box sends a signal to the processor and the routine, at block 604 would check the status of the coin box signal and proceed to block 606, where the processor would reset $T_c$ to $T_a$ whenever the coin box signal was received.

Although an embodiment is described with one week as the allotment period, the invention will work equally well with any allotment period. For example, if the lock 10 is used to control medical equipment which can only be safely used for 30 hours per month, the allotment period could be 30 days and $T_a$ could be set to 30 hours.

At block 608, if F (timer flag) is set, indicating that any use of the television is to count against the remaining time in $T_c$, then the routine proceeds to block 610, where the processor 30 reads the current sensor 26 to determine if the television is on. If F is not set, or the television is off, the routine proceeds to block 612. If F is set and the television is on, $T_c$ is decremented by the interrupt interval, at block 614. The effect of this operation is that $T_c$ starts out equal to $T_a$ (allotted time) at the beginning of each week, and runs down whenever F is set and the television is on. The interrupt interval is small enough so that it is unimportant that the television may not have been on for the entire interrupt interval even though the full time of the interrupt interval is subtracted from $T_c$.

After updating the display 40, the routine returns at block 616. To update the display, the processor 30 determines where in its logic flow the main program is, and displays the appropriate value on the display 40. If the main program is in the main loop (see FIG. 4a), then T (current time) is sent to the segment driver 38 which then causes display 40 to display the value of T. If the main program is in loop A (set timer flag and allotted time), the current values for $T_a$ (allotted time) and an indication of the state of F are displayed. If the main program is in loop B (set time), T (current time) is displayed. If the main program is in loop C (set program), one of the start or end times which define a blocked time range will be displayed. The particular start or end time is determined by the value of the pointer S. In this way, the display generally shows the time or quantity that is being currently adjusted by the user, and displays the time of day when no adjusting is being done.

Ideally, the interrupt interval should be small enough so that the display 40 appears to the human eye to be contemporaneously updated. An interval of several seconds is unacceptable, since the display would lag behind the true value of the number being displayed when the keys 52-55 are being pressed. An interval of approximately 10 to 100 milliseconds is sufficient. $T_c$ may optionally be displayed when, for example, the select key is pressed in the main loop.

Figure 6:
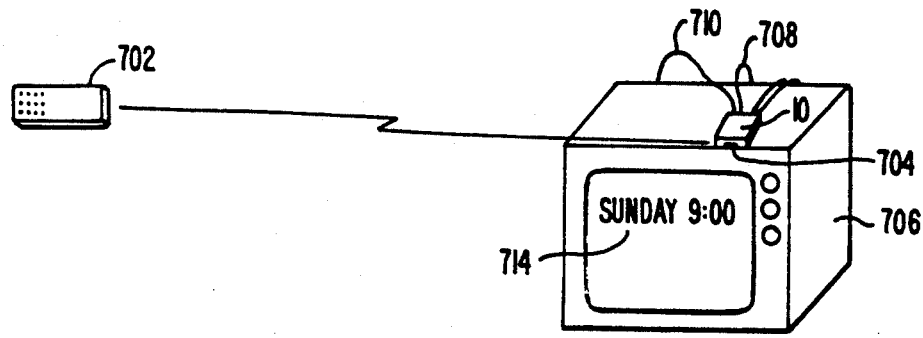
FIG. 6 illustrates an alternate embodiment of the invention where a remote control device is used for input to the lock and a television screen is used for display.

FIG. 6 illustrates an alternate embodiment of the invention where input is received from a remote control device and output is used to limit access to one or more channels. Such systems are known to those of skill in the art and are described in, for example, Rzeszewski et al., "A Microcomputer Controlled Frequency Synthesizer for TV", IEEE Trans. Consum. Electron., vol. CE-24, p. 145-153 (May 1978), incorporated herein by reference for all purposes. It is possible to use a remote control device with the display shown in FIGS. 2a, 2b; however, the usefulness of such a remote control device would be diminished by the fact that display 40 is difficult to read at any great distance. In some embodiments, the invention use a television display with a keyboard contained on the lock; however, this also has diminished usefulness, as viewing a television while being within arm's reach of the lock, which is often atop the television, may be difficult.

The keyboard of the remote control device 702 is used to perform the same functions as keys 50-54 shown in FIG. 1. In preferred embodiments, the remote control device is the same device as the one used for selection of channels and the like on the television. Ideally, the function of toggle switch 50 is implemented in software or on the remote control device 702 itself. Signals sent from the remote control device 702 are received by a remote receiver 704, which is part of the lock 10, positioned from the remote control device. As with the remote control device, the functionality of the lock and receiver is preferably combined with the normal television equipment so as to reduce the number of additional components required to implement the present invention by utilizing existing components of the television circuitry. In preferred embodiments, the device is operably to the television tuner rather than controlling the power to the television and blocks the operation of one, several, or all of the channels during selected times.

Figure 7:
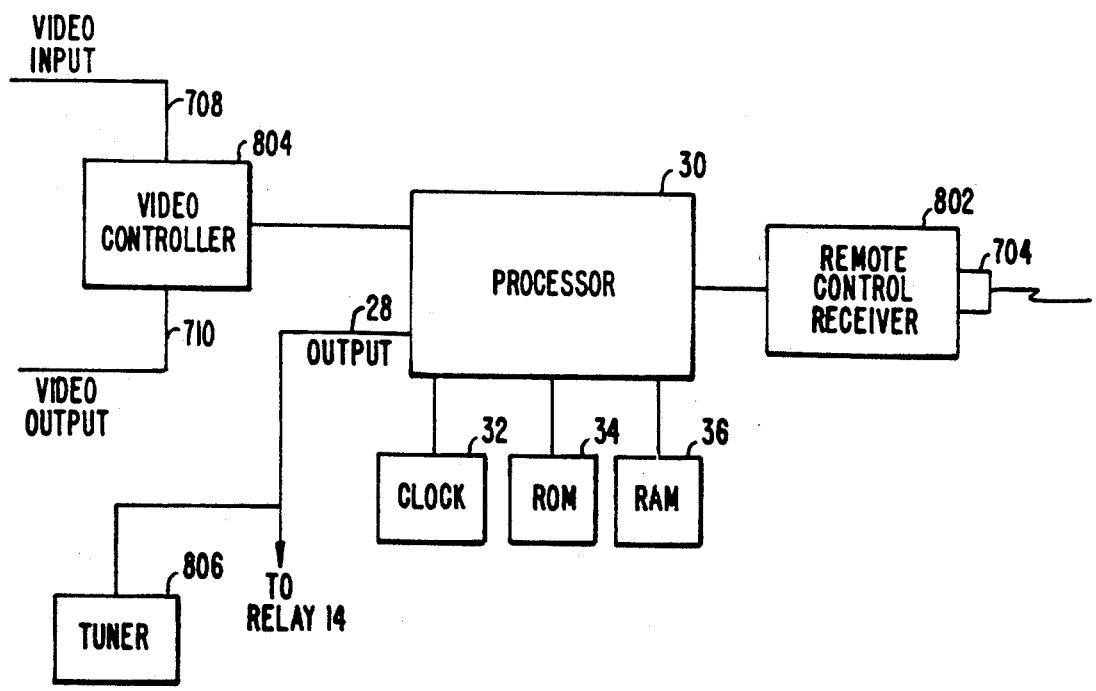
FIG. 7 is a block diagram of an alternate embodiment of the lock.

Video input 708 carries a television signal into the lock 10. The lock contains electronics, described in FIG. 7, which superimposes characters over the video signal and sends this mixed signal via cable 710 to television 706. As a consequence, characters 714 are visible on the screen, thus forming a display, readable by humans, using the television as shown in FIG. 7. For convenience, all of the values of memory variables stored in RAM 36 can be displayed simultaneously on the screen, along with instructions to the user.

FIG. 7 is a block diagram showing the additional electronics used to implement the embodiment shown in FIG. 6. Remote control receiver logic 802 converts incoming signals into data readable by the processor 30. This conversion is well known in the art of television remote control device design.

Video controller 804 receives commands from the processor 30, and on the basis of those commands creates a video image of white characters on a black background and superimposes that video image on the image received from video input cable 708, and outputs the combination to video output cable 710. This image creation and mixing is well known in the art of video electronic design. In one preferred embodiment, the processor output is connected not only to relay 14, but also to tuner 806. Accordingly, the device controls power to the television and, in a similar manner, one or more particular stations on the tuner. Of course, in this embodiment, power need not be limited at the plug, but may be controlled to the display or the like.

While various aspects of the invention have been set forth by the drawings and specification, it is to be understood the foregoing detailed description is for illustration only and that various changes in parts and operations, as well as substitutions of equivalents for those shown and described may be made without departing from the spirit and scope of the invention as set forth in the appended claims.

What is claimed is:

1. An electronic appliance lock comprising:
   a capture means for securing an appliance power plug;
   a power means for drawing power from a suitable source of electricity;
   a power switching means for controlling the flow of power from said suitable source of electricity to said appliance power plug, said power switching means controlled by a control signal;
   an entry means for entering password data and input parameters;
   a memory means for storing power control parameters, wherein said power control parameters indicate, according to predetermined power control criteria, whether said control signal is to be asserted; and
   a processing means coupled to said entry means, said memory means, and said power switching means, for processing said input parameters received from said entry means and modifying said power control parameters only when said password data received from said entry means matches predetermined password criteria, said processing means also asserting said control signal according to said power control parameters and said predetermined power control criteria.

2. An electronic appliance lock as in claim 1, wherein said entry means comprises a readable display and at least one input switch.

3. An electronic appliance lock as in claim 2, wherein said readable display is generated on a television screen.

4. An electronic appliance lock as in claim 2, wherein said at least one switch is part of a remote control device which is not directly connected to said processing means.

5. An electronic appliance lock as in claim 2, wherein said at least one switch comprises one toggle switch and five pressable keys.

6. An electronic appliance lock as in claim 1, wherein said appliance power plug supplies power to a television.

7. An electronic appliance lock as in claim 1 wherein said processing means contains a password altering means to alter said selected password and a means for electronically limiting access to said password altering means to only those persons knowing a selected master password.

8. An electronic appliance lock as in claim 1, wherein said capture means permanently captures said appliance power plug.

9. An electronic appliance lock as in claim 8, wherein said capture means comprises gripping means enclosed within said capture means.

10. An electronic appliance lock as in claim 9 said gripping means comprising:
    a flexible arm having one end attached to a housing of said capture means;
    a pin on the end of said flexible arm not attached to said housing; and
    a pressure plate attached to said housing, in such a manner that a prong of a plug inserted into said capture means slides between said pressure plate and said flexible arm, said pressure plate attached to said housing at a distance from said flexible arm such that said prong causes said flexible arm to flex, thereby forcing said pin against said prong with sufficient force to prevent the removal of said prong without destroying said prong or said housing.

11. An electronic appliance lock as in claim 8, wherein permanent capture of said appliance power plug is by means of unidirectional screws.

12. An electronic appliance lock as in claim 1, wherein said processing means comprises a microprocessor.

13. An electronic appliance lock as in claim 1, wherein said processing means is powered by a least one internal battery.

14. An electronic appliance lock as in claim 1, wherein said processing means prevents power from flowing to said appliance power plug if power to said processing means is interrupted.

15. An electronic appliance lock as in claim 1, wherein the lock is plug attachable.

16. An electronic appliance lock as in claim 1, wherein the lock is built into a television and controls the power supplied to said television.

17. An electronic appliance lock as in claim 1, wherein said processing means limits the total amount of time in an allocation period that said appliance can be used and limits the time periods in which said appliance can be used.

18. A television lock comprising:
    a power switching means;
    a memory means for storing variables, said variables comprising at least one password variable and at least one power control parameter;
    an input means for user entry of values for said stored variables;
    a display means for display of said stored variables;
    a clock means for tracking the passage of time; and
    a processing means for gathering data from said input means and said clock means, for supplying data to said display means for display, and for controlling the television display by controlling power flow to the television using said power switching means, thereby limiting use of the television, wherein said processing means alters said at least one power control parameter only when a password value of said values matches said at least one password variable.

19. The television lock as recited in claim 18 wherein said control means regulates access to one or more channels in said television.

* * * * *